United States Patent [19]

Blake

[11] 4,413,080

[45] Nov. 1, 1983

[54] WATER-DISPERSIBLE PRESSURE-SENSITIVE ADHESIVE AND TAPE MADE THEREWITH

[75] Inventor: Frederick D. Blake, Woodbury, Minn.

[73] Assignee: Minnesota Mining and Manufacturing Co., St. Paul, Minn.

[21] Appl. No.: 390,638

[22] Filed: Jun. 21, 1982

[51] Int. Cl.³ ............................ C09J 3/26; C09J 5/02; C09J 7/04
[52] U.S. Cl. .................................. 524/187; 524/272; 428/355; 428/356
[58] Field of Search ................ 524/272, 187; 428/355, 428/356

[56] References Cited

U.S. PATENT DOCUMENTS

| | | | |
|---|---|---|---|
| 2,838,421 | 6/1958 | Sohl | 117/122 |
| 3,441,430 | 4/1969 | Peterson | 117/68.5 |
| 3,661,874 | 5/1972 | Olson | 260/83.3 |
| 3,865,770 | 2/1975 | Blake | 260/27 |

*Primary Examiner*—John Kight, III
*Assistant Examiner*—M. L. Moore
*Attorney, Agent, or Firm*—Donald M. Sell; James A. Smith; Richard E. Brink

[57] ABSTRACT

Water-dispersible pressure-sensitive adhesive useful for splicing carbonless paper without deactivating its color-generating system. Certain acrylate:acrylic acid copolymers are blended with acidic rosin or rosin derivative, partially neutralized with KOH in combination with NaOH and/or LiOH, and plasticized with an oily water-soluble polyoxyethylene compound. Repulpable splicing tapes can be made with the adhesive.

7 Claims, No Drawings

WATER-DISPERSIBLE PRESSURE-SENSITIVE ADHESIVE AND TAPE MADE THEREWITH

BACKGROUND OF THE INVENTION

This invention relates to water-dispersible pressure-sensitive adhesives and to normally tacky and pressure-sensitive adhesive tapes made therewith.

Papermaking and printing operations require splicing the end of one roll of paper to the beginning of another, as well as splicing together a roll after defective material is cut out. It is important that such splices be made quickly and easily, necessitating the use of an adhesive that rapidly attains maximum strength and retains it throughout subsequent operations. In an era where ecology and conservation are both vital concerns, it is important that the spliced portions not be destroyed but that they be returned to the paper mill for reprocessing; it is thus essential that the splices (particularly the adhesive which is used to make it) be water-dispersible and repulpable. This combination of requirements precludes the use of such conventional adhesives as normally tacky and pressure-sensitive rubber-resin adhesives. In the past, several water-soluble, pressure-sensitive adhesives have been devised and employed commercially, but none has been able to achieve the desired combination of physical properties and low cost.

An early adhesive used in splicing paper was polyacrylic acid, a water-soluble polymer which is rubbery in the presence of water but which becomes brittle and friable at low humidities. Sohl U.S. Pat. No. 2,838,421 discloses a splicing tape in which related rubbery polymer adhesives are blended with polypropylene glycol to impart flexibility, particularly in low humidity environments. Double-coated paper tapes made with such adhesives have been widely used in the papermaking and printing industry; although excellent in many respects, the release from the liner interleaved in the roll of tape is adversely influenced by high ambient humidity.

Peterson U.S. Pat. No. 3,441,430 discloses a splicing tape product in which the pressure-sensitive adhesive is a water-soluble acrylic acid:ether acrylate copolymer tackified with a liquid water-soluble plasticizer containing at least one ether linkage. Because of the ether linkage, this adhesive is inherently sensitive to oxidation, and its performance characteristics are greatly influenced by conditions to which it has previously been subjected. For example, exposure to high temperature (either before or after use in splicing) tends to reduce tackiness, flexibility, and repulpability. It is not always possible to protect the tape from such conditions.

Olson U.S. Pat. No. 3,661,874 discloses a water-soluble pressure-sensitive adhesive made by reacting an epoxidized rubbery polymer with a water-soluble secondary monoamine and tackifying the polymer with a water-soluble tackifier-plasticizer. When carefully formulated, this adhesive has outstanding physical characteristics, meeting all the requirements imposed by the papermaking industry, but the manufacturing process is complex and hence expensive.

Blake U.S. Pat. No. 3,865,770 discloses a water-dispersible pressure-sensitive adhesive in which an acrylate:vinyl carboxylic acid copolymer is reacted with a lower secondary or tertiary alkanolamine to impart water solubility, tackifiers or plasticizers being added if necessary. Adhesives of this type have excellent tackiness and heat stability, are readily repulpable, and are comparatively inexpensive. Special problems arise, however, when adhesives of this type are used to splice carbonless paper, the alkanolamine tending to volatilize and migrate, defeating the effectiveness of carbonless paper to perform its intended function, either by forming a stable complex with nickel ion which would otherwise react with dithiooxamide derivative or by neutralizing the acidic substance which would impart color to an acid-activated dye.

SUMMARY OF THE INVENTION

The present invention provides a water-dispersible normally tacky and pressure-sensitive adhesive having all the advantages of the adhesive of U.S. Pat. No. 3,865,770, together with the additional advantage that it can be used to splice carbonless paper without adversely affecting its performance.

The normally tacky and pressure-sensitive water-dispersible adhesive of the invention comprises the blended reaction product of
  (a) 100 parts by weight of a copolymer of monomers consisting essentially of
    (1) about 75-85 weight percent of at least one monomeric acrylic acid ester of nontertiary alkyl alcohol, and
    (2) correspondingly about 25-15 weight percent of vinyl carboxylic acid,
  (b) about 35-100 parts by weight of acidic rosin or rosin derivative,
  (c) sufficient potassium hydroxide to neutralize about 30-45% of the combined carboxyl groups of the copolymer and rosin or rosin derivative
  (d) sufficient sodium hydroxide, lithium hydroxide, or a combination of sodium and lithium hydroxide to neutralize about 20-45% of said carboxyl groups, and
  (e) about 100-225 (preferably at least about 125) parts by weight of oily plasticizing water-soluble polyoxyethylene compound.

As will be apparent from the ranges indicated above, substantial variations in composition are possible. To illustrate, the use of higher percentages of short-chain acrylates in a copolymer tends to increase the hardness of the adhesive, decreasing its tackiness; in such event, it is desirable to use a comparatively higher percentage of plasticizer. Similarly, the higher the percentage of vinyl carboxylic acid in the copolymer, the less neutralization that is necessary to insure water-solubility. The use of such well-known acrylate monomers as isooctylacrylate increases the tackiness of the ultimate adhesive and improves its adhesion to paper; on the other hand, the resultant copolymer is harder to dissolve and generally requires the addition of either more rosin or more solvent than would otherwise be the case. In general, if an insufficient amount of rosin is present, the oily non-ionic plasticizer tends to separate from the ionic neutralized acrylate polymer, while if too much rosin is present, the tackiness of the adhesive is reduced.

It has been found important to use two different alkali metal hydroxides in connection with nuetralization, no single alkali metal hydroxide providing an optimum balance of properties. For example, neutralization with only potassium hydroxide increases the tackiness of the adhesive but decreases the shear value; on the other hand, use of only sodium or lithium hydroxide increases the shear values but decreases the tackiness.

Test Procedures

It is believed that a brief explanation of certain test procedures, used to evaluate various characteristics of water-soluble pressure-sensitive adhesives and tapes made therewith, will be helpful in understanding the invention.

Rolling Ball Tack

In this test an 11-mm diameter steel ball is rolled down a plane having a length of 18 cm and inclined at an angle of 21°30′ to a horizontal surface on which the tape to be evaluated is positioned, adhesive side up, the adhesive thickness being at least 25 micrometers. The distance the ball rolls along the horizontal adhesive surface is measured, the tack being inversely proportional to the distance. Further details of this test are found in Test Methods for Pressure-Sensitive Tapes, 6th Edition, Pressure-Sensitive Tape Council, Glenview, Ill. 60025, Test No. PSTC-6. Generally speaking, adhesives used in the practice of this invention should have a rolling ball tack value of no more than 8 cm and preferably less than 4 cm. Where tape is to be used in splicing rolls of paper together at speeds of perhaps 750 m/minute (i.e., in making so-called flying splices), tack values of less than 1.5 cm are greatly preferred.

Quick Stick

The adhesive surface of a 2.54-cm×30-cm strip of tape is lightly placed in contact with a 5-cm×12.5-cm steel panel and removed at 90° to the panel surface at 30.5 cm/minute. The force of removal is measured and reported in g/cm width. Further details of this test are found in the aforementioned Test Methods for Pressure-Sensitive Tapes, Test PSTC-5. It is believed that adhesives useful in the practice of this invention should have a quick stick value of at least 10 g/cm with a value of 60 g/cm or more being greatly preferred for flying splice application.

Shear Adhesion

A 2.54-cm×2.54-cm end portion of a 2.54-cm×15-cm strip of tape, formed by coating a 25-micrometer thick layer of adhesive on 68 g/m$^2$ supercalendered kraft paper backing, is adhered to a bright annealed steel test panel and rolled down with two passes of a 2-kg roller. The panel is then clamped in a jig which is disposed at 2° to the vertical, so that the 12.5-cm free end of the tape extends downward, at an angle of 178° to the test panel, and a 1000-gram weight is attached to the tape end. The time for the tape to separate from the panel is reported in minutes, the shear strength being directly related to the elapsed time. Further details are found in the aforementioned Test Methods for Pressure-Sensitive Tapes, Test PSTC-7. It is desirable to have shear time as high as possible, preferably exceeding 500 minutes, although an extremely tacky adhesive may be satisfactory if its shear time is as low as 60–80 minutes. Shear adhesion values are directly related to the inherent viscosity of the copolymer component of the adhesive.

Water-Dispersibility

The material to be tested is converted to liquid form (if such is not its natural state) by dissolving it in an appropriate organic solvent or by heating it to impart fluidity. A layer of the material is then coated on one surface of 68 g/m$^2$ supercalendered kraft paper and any solvent removed by oven drying to leave a coating on the order of 25–50 micrometers thick. A few drops of water are then sprinkled on the surface and the thus-moistened surface rubbed with a finger. A water-dispersible material will first become slippery and then begin to dissolve. The procedure outlined in the subsequently described repulpability test may also be followed.

Repulpability

A 20-cm×2.54-cm strip of double-coated splicing tape is sandwiched between two 20-cm×2.54-cm strips of blotter paper* and cut into approximately 1.5-cm squares. To these squares is added a sufficient number of 1.5-cm squares of blotter paper to make a total of 15 grams, after which all the squares are placed in a Waring Blendor with 500 ml of water. After the blendor has run for 30 seconds, the stock whick has splattered up the sides and on the cover is washed back into the bottom with a wash bottle. The blendor is again run for 30 seconds and washed as before, after which it is run for a final 30 seconds. The stock is removed from the blendor, rinsed twice with water, and made into a hand sheet, using a large sheet mold. The sheet is couched off the mold, pressed between blotters for 1½ minutes in a hydraulic press, removed, dried, and examined for any particles of unrepulped splicing tape. If no such particles are present, the tape is considered satisfactory. Further details are found in TAPPI Test UM-213.

*For tape having adhesive on only one side, two 20-cm×2.54-cm strips are adhered to blotter paper.

The foregoing test does not apply to tape products where, e.g., the backing is a biaxially oriented polyester film, which does not lend itself to repulping. Such backings are strong, however, and may be used in splicing tape, provided the loosened backing is mechanically removed from the beater.

The rolling ball tack test, quick stick test, and repulpability test are equally applicable to transfer tapes, where the adhesive layer, (or, optionally two layers of adhesive flanking a fibrous reinforcing layer) is carried by a strippable release liner. In using such tapes, the exposed surface of the adhesive is placed in contact with the paper, the liner stripped away, and the second sheet of paper adhered to the newly exposed adhesive surface.

Carbonless Paper Deactivation

Since carbonless papers function by interaction of chemical materials on two separate paper surfaces, samples for this test must be prepared using both of the papers involved.

Samples are prepared by placing a 2.54 cm strip of the subject tape on the side of the paper sample opposite the coated side to be evaluated and placed in a 45°–50° C. oven for 12–15 hours. Each of the taped samples is then paired with a fresh sheet of the complementary paper. The paired sheets are placed in a typewriter and a message is typed over the area where the tape has been in contact with the paper. Any abnormality in the development of the carbonless image is noted.

DESCRIPTION OF PRESENTLY PREFERRED EMBODIMENTS

It is believed that understanding of the invention will be enhanced by considering several illustrative but non-limiting examples. In each case, an acrylate:vinyl carboxylic acid copolymer was prepared, generally as described in Ulrich U.S. Pat. No. Re. 24,906. The monomers to be copolymerized were dissolved in ethyl acetate and, using azobisisobutyryl nitrile as a catalyst, the solution held at 53° C. for 24 hours, at which time polymerization was largely completed. To the resultant viscous solution was then added sufficient methanol to reduce the solids content to about 20–22%. The inherent viscosities obtained were in the range of 1.6 to 2.2 dl/g.

A separate composition was prepared by mixing resin, isopropyl alcohol, and aqueous solutions of alkali metal hydroxide. After three hours of mixing, a clear generally yellow to orange solution was obtained, at which time the oily polyoxyethylene compound was added and mixing continued, the final composition being a clear solution still retaining its yellow to orange color. Appropriate amounts of this composition were blended into the acrylate:vinyl carboxylic acid copolymer, yielding a clear, substantially color-free solution. This solution was coated directly on a 68 g/m² supercalendered kraft paper backing and the solvent evaporated to leave a layer of normally tacky and pressure-sensitive adhesive on the order of 25 micrometers thick. The resultant tape product was then evaluated, using the previously described test procedures.

For convenience, the examples are set forth below in tabular form, all prepared in substantially in accordance with the procedure just described. All parts and percentages are by weight unless otherwise noted. In each case, the adhesive was water-dispersible and splices formed therewith were repulpable. When tested for splicing carbonless paper, no deactivation occurred. The following abbreviations have been employed:

Acrylate monomers

IOA: iso-octyl acrylate
BA: n-butyl acrylate

Vinyl Carboxylic Acid Monomers

AA: acrylic acid
IA: itaconic acid

Rosins

TOR: tall oil rosin
TORD: disproportionated tall oil rosin
TORP: polymerized tall oil rosin
WR: wood rosin
WRH: hydrogenated wood rosin
WRD: disproportionated wood rosin
WRHD: disproportionated hydrogenated wood rosin
WRP: polymerized wood rosin

Polyoxyethylene compounds

ME: methoxy poly(oxyethylene)ethanol having a reported molecular weight of 350
NP 1.5: polyoxyethylene adduct of nonyl phenol, 1.5 EtO groups per molecule
NP 3: polyoxyethylene adduct of nonyl phenol, 3 EtO groups per molecule
NP 9: polyoxyethylene adduct of nonyl phenol, 9 EtO groups per molecule
NP 15: polyoxyethylene adduct of nonyl phenol, 15 EtO groups per molecule
OP 3: polyoxyethylene adduct of octyl phenol, 3 EtO groups per molecule
OP 9: polyoxyethylene adduct of octyl phenol, 9 EtO groups per molecule
PE: phenoxy poly(oxyethylene)ethanol, 4 EtO groups per molecule
PEG: polyoxyethylene glycol, molecular weight of 600
PNPNa$^{30}$: partial sodium salt of complex phosphate of NPEO, having about 5 EtO groups in each of the two NPO chains Those persons skilled in the art will recognize that it is not feasible to set forth all the variations to which this invention is susceptible, and many modifications will readily suggest themselves, especially if certain principles are borne in mind. For example, the shorter the chain length of the alcohol from which the acrylate monomer is derived, the firmer the resultant pressure-sensitive adhesive. If a softer adhesive is desired, the chain length of the alcohol may be increased. If greater shear strength for an adhesive made with a given copolymer is desired, a higher molecular weight, as evidenced by a higher inherent viscosity, can be used; alternatively, a small amount of a known crosslinking agent can be incorporated.

It will likewise be recognized that, to achieve specific results, it may be desirable to incorporate minor amounts of monomeric modifiers into copolymers used to formulate adhesives of the invention, for example, styrene or methyl methacrylate increases firmness, tert-butyl styrene increases tack, etc. Similarly, dyes, pigments, fillers, etc. may be added where necessary or desirable.

Although this information has been particularly described with respect to a splicing tape for papermaking and printing operations, the pressure-sensitive adhesive has many other uses. For example, water-soluble adhesive labels may be applied to dishes, windows, or other surfaces which it is common to clean with aqueous solvent. Cloth labels coated with this adhesive may readily be washed from garments to which they are affixed. Likewise, since the adhesive is substantially insoluble in most oils or similar hydrocarbon solvents, it may be employed in applications where conventional normally tacky and pressure-sensitive adhesive tapes prove unsatisfactory.

TABLE I

| Ex. No. | Copolymer Acrylate Monomer Type | Parts | Acid Monomer Type | Parts | COOH equivalents | Acidic Rosin Type | Parts | COOH equivalents | Total COOH equivalents | Alkali Metal Hydroxide, OH Equivalents KOH | NaOH | LiOH | Total | Polyoxyethylene Compound Tackifier Type | Parts | Rolling Ball Tack, cm | Performance Characteristics Shear Adhesion mins. | Quick Stick, g/cm width |
|---|---|---|---|---|---|---|---|---|---|---|---|---|---|---|---|---|---|---|
| 1 | BA | 75 | AA | 25 | 0.347 | WRH | 66 | 0.189 | 0.536 | 0.189 | 0.0347 | — | 0.224 | NP 9 | 127 | 4.6 | 245 | |
| 2 | BA | 75 | AA | 25 | 0.347 | WRH | 66 | 0.189 | 0.536 | 0.189 | 0.0694 | — | 0.258 | NP 9 | 128 | 3.0 | 302 | |
| 3 | BA | 75 | AA | 25 | 0.347 | WRH | 67 | 0.191 | 0.538 | 0.191 | 0.104 | — | 0.295 | NP 9 | 130 | 2.4 | 763 | |
| 4 | BA | 75 | AA | 25 | 0.347 | WRH | 68 | 0.194 | 0.541 | 0.194 | 0.139 | — | 0.333 | NP 9 | 132 | 1.3 | 5,000+ | |
| 5 | BA | 75 | AA | 25 | 0.347 | WRH | 68 | 0.194 | 0.541 | 0.194 | 0.104 | — | 0.298 | NP 9 | 131 | 4.4 | 357 | |
| 6 | BA | 75 | AA | 25 | 0.347 | WRH | 69 | 0.197 | 0.544 | 0.197 | 0.104 | 0.035 | 0.370 | NP 9 | 214 | 1.3 | 96 | |
| 7 | BA | 75 | AA | 25 | 0.347 | WRH | 69 | 0.197 | 0.544 | 0.097 | 0.069 | 0.069 | 0.236 | NP 9 | 132 | 1.5 | 7,000+ | |
| 8 | BA | 75 | AA | 25 | 0.347 | WRH | 34 | 0.097 | 0.444 | 0.097 | 0.139 | — | 0.414 | NP 9 | 132 | 1.4 | 6,643 | |
| 9 | BA | 75 | AA | 25 | 0.347 | WRH | 100 | 0.285 | 0.632 | 0.285 | 0.139 | — | 0.528 | NP 9 | 132 | 1.4 | 1,026 | |
| 10 | BA | 75 | AA | 25 | 0.347 | WRH | 136 | 0.389 | 0.736 | 0.389 | 0.139 | — | 0.333 | NP 9 | 132 | 15+ | 7,500+ | |
| 11 | BA | 75 | AA | 25 | 0.347 | WRH | 68 | 0.194 | 0.541 | 0.194 | 0.139 | — | 0.333 | PEG | 132 | 2.4 | 7,500+ | |
| 12 | BA | 75 | AA | 25 | 0.347 | WRH | 68 | 0.194 | 0.541 | 0.194 | 0.139 | — | 0.333 | ME | 132 | 1.0 | 540 | |
| 13 | BA | 75 | AA | 25 | 0.347 | WRH | 68 | 0.194 | 0.541 | 0.194 | 0.139 | — | 0.333 | NP 1.5 | 211 | 1.0 | 4,240+ | |
| 14 | BA | 75 | AA | 25 | 0.347 | WRH | 68 | 0.194 | 0.541 | 0.194 | 0.139 | — | 0.333 | NP 15 | 211 | 1.0 | 303 | |
| 15 | BA | 75 | AA | 25 | 0.347 | WRH | 68 | 0.194 | 0.541 | 0.194 | 0.139 | — | 0.333 | OP 3 | 211 | 1.1 | 4,250+ | |
| 16* | BA | 75 | AA | 25 | 0.347 | WRH | 68 | 0.194 | 0.541 | 0.194 | 0.139 | — | 0.333 | OP 9 | 211 | 1.9 | 135 | |
| 17 | BA | 75 | AA | 25 | 0.347 | WRD | 69 | 0.179 | 0.526 | 0.179 | 0.139 | — | 0.318 | NP 9 | 132 | 0.8 | 3,200+ | |
| 18 | BA | 75 | AA | 25 | 0.347 | WR | 68 | 0.198 | 0.545 | 0.198 | 0.139 | — | 0.337 | NP 9 | 211 | 1.5 | 3,200+ | |
| 19 | BA | 75 | AA | 25 | 0.347 | WRHD | 68 | 0.194 | 0.541 | 0.194 | 0.139 | — | 0.333 | NP 9 | 211 | 1.0 | 5,300+ | |
| 20 | BA | 75 | AA | 25 | 0.347 | TORP | 68 | 0.174 | 0.521 | 0.174 | 0.139 | — | 0.313 | NP 9 | 211 | 1.3 | 3,200+ | |
| 21 | BA | 75 | AA | 25 | 0.347 | TOR | 68 | 0.194 | 0.541 | 0.194 | 0.139 | — | 0.333 | NP 9 | 211 | 1.4 | 5,400+ | |
| 22 | BA | 75 | AA | 25 | 0.347 | TORD | 68 | 0.194 | 0.541 | 0.194 | 0.139 | — | 0.333 | NP 9 | 211 | 2.2 | 5,400+ | |
| 23 | BA | 75 | AA | 25 | 0.347 | WRH | 69 | 0.194 | 0.541 | 0.194 | — | 0.149 | 0.343 | NP 9 | 132 | 2.4 | 1,904 | 29.9 |
| 24 | BA | 75 | AA | 25 | 0.347 | WRH | 69 | 0.194 | 0.541 | 0.194 | — | 0.347 | 0.541 | NP 9 | 132 | 1.6 | 4,996 | 26.1 |
| 25 | BA | 75 | IA | 25 | 0.347 | WRH | 68 | 0.194 | 0.541 | 0.194 | 0.139 | — | 0.333 | PNPNa+ | 132 | 2.4 | 1,028 | |
| 26* | BA | 75 | IA | 25 | 0.347 | WRH | 70 | 0.200 | 0.547 | 0.349 | — | — | 0.349 | PNPNa+ | 135 | 2.4 | 64 | |
| 27 | BA | 80 | AA | 20 | 0.278 | WRH | 68 | 0.194 | 0.472 | 0.194 | 0.139 | — | 0.336 | NP 9 | 132 | 0.8 | 192 | |
| 28 | BA | 80 | AA | 20 | 0.278 | WRH | 69 | 0.197 | 0.475 | 0.197 | 0.174 | — | 0.371 | NP 9 | 134 | 0.6 | 3,564 | |
| 29 | BA | 80 | AA | 20 | 0.278 | WRH | 70 | 0.200 | 0.478 | 0.200 | 0.209 | — | 0.409 | NP 9 | 134 | 0.6 | 4,100+ | |
| 30* | BA | 80 | AA | 20 | 0.278 | WRH | 70 | 0.200 | 0.478 | 0.200 | — | — | 0.374 | NP 9 | 134 | 1.0 | 49 | 84.0 |
| 31* | BA | 80 | AA | 20 | 0.278 | WRH | 70 | 0.200 | 0.478 | 0.374 | 0.374 | 0.374 | 0.374 | NP 9 | 134 | 1.0 | 5,500 | 11.2 |
| 32* | BA | 80 | AA | 20 | 0.278 | WRH | 70 | 0.200 | 0.478 | — | 0.374 | — | 0.333 | NP 9 | 132 | 20+ | — | |
| 33 | BA | 85 | AA | 15 | 0.208 | WRH | 68 | 0.194 | 0.402 | 0.194 | 0.139 | — | 0.333 | NP 9 | 132 | 0.3 | 29 | |
| 34 | BA | 85 | AA | 15 | 0.208 | WRH | 69 | 0.197 | 0.405 | 0.197 | 0.174 | — | 0.371 | NP 9 | 134 | 0.6 | 58 | |
| 35* | BA | 85 | AA | 15 | 0.208 | WRH | 69 | 0.197 | 0.405 | 0.371 | — | — | 0.371 | NP 9 | 134 | 0.5 | 5 | |
| 36 | BA | 60 | | | | | | | | | | | | | | | | | |
| 37 | IOA | 15 | AA | 25 | 0.347 | WRH | 68 | 0.194 | 0.541 | 0.194 | 0.139 | — | 0.333 | NP 9 | 132 | 1.1 | 5,400+ | |
| | BA | 60 | | | | | | | | | | | | | | | | | |
| 38 | IOA | 15 | AA | 25 | 0.347 | WRH | 68 | 0.194 | 0.541 | 0.194 | 0.139 | — | 0.333 | PE | 27 | 0.8 | 5,400+ | |
| | BA | 45 | | | | | | | | | | | | | | | | | |
| 39 | IOA | 30 | AA | 25 | 0.347 | WRH | 68 | 0.194 | 0.541 | 0.194 | 0.139 | — | 0.333 | NP 9 | 132 | 0.9 | 4,500+ | |
| | BA | 45 | | | | | | | | | | | | | | | | | |
| 40 | IOA | 30 | AA | 25 | 0.347 | WRH | 68 | 0.194 | 0.541 | 0.194 | 0.139 | — | 0.333 | NP 9 | 185 | 0.5 | 4,500+ | |
| | BA | 64 | | | | | | | | | | | | | | | | | |
| 41* | IOA | 16 | AA | 20 | 0.278 | WRH | 69 | 0.197 | 0.475 | 0.197 | 0.174 | — | 0.371 | NP 9 | 134 | 1.3 | 2,653 | |
| | BA | 64 | | | | | | | | | | | | | | | | | |
| 42* | IOA | 16 | AA | 20 | 0.278 | WRH | 69 | 0.197 | 0.475 | 0.197 | 0.209 | — | 0.406 | NP 9 | 134 | 0.9 | 4,280 | |
| | BA | 64 | | | | | | | | | | | | | | | | | |
| | IOA | 16 | AA | 20 | 0.278 | WRH | 69 | 0.197 | 0.475 | 0.197 | 0.209 | — | 0.406 | NP 9 | 190 | 0.8 | 4,450 | |

What is claimed is as follows:

1. Normally tacky and pressure-sensitive water-dispersible adhesive comprising the blended reaction product of
   (a) 100 parts by weight of a copolymer of monomers consisting essentially of
      (1) about 75–85 weight percent of at least one monomeric acrylic acid ester of nontertiary alkyl alcohol, and, correspondingly,
      (2) about 25–15 weight percent of vinyl carboxylic acid,
   (b) about 35–100 parts by weight of acidic rosin or rosin derivative,
   (c) sufficient potassium hydroxide to neutralize about 30–45% of the combined carboxyl groups of the copolymer and rosin or rosin derivative,
   (d) sufficient sodium hydroxide, lithium hydroxide, or a combination of sodium and lithium hydroxide to neutralize about 20–45% of said carboxyl groups, and
   (e) about 100–225 parts by weight of oily plasticizing water-soluble polyoxyethylene compound.

2. The adhesive of claim 1 wherein the acrylic acid ester comprises butyl acrylate and the vinyl carboxylic acid comprises acrylic acid.

3. The adhesive of claim 2 wherein the acrylic acid ester consists essentially of iso-octyl acrylate and butyl acrylate in the weight ratio of about 2:3–1:4.

4. The adhesive of claim 3 wherein about 30 to 45% of the carboxyl groups are neutralized with potassium hydroxide and about 20 to 45% are neutralized with sodium hydroxide.

5. Normally tacky and pressure-sensitive adhesive tape having particular utility in splicing carbonless papers comprising a self-sustaining sheet backing provided on at least one face with a thin layer of the adhesive of claim 2.

6. The tape of claim 5 wherein the backing is water-dispersible, whereby the tape is repulpable.

7. The tape of claim 6 wherein both sides of the backing are provided with a thin layer of the adhesive of claim 3.

* * * * *